Oct. 9, 1962 K. H. KOEHNE 3,057,199
GAUGING APPARATUS
Filed Dec. 26, 1957 2 Sheets-Sheet 2
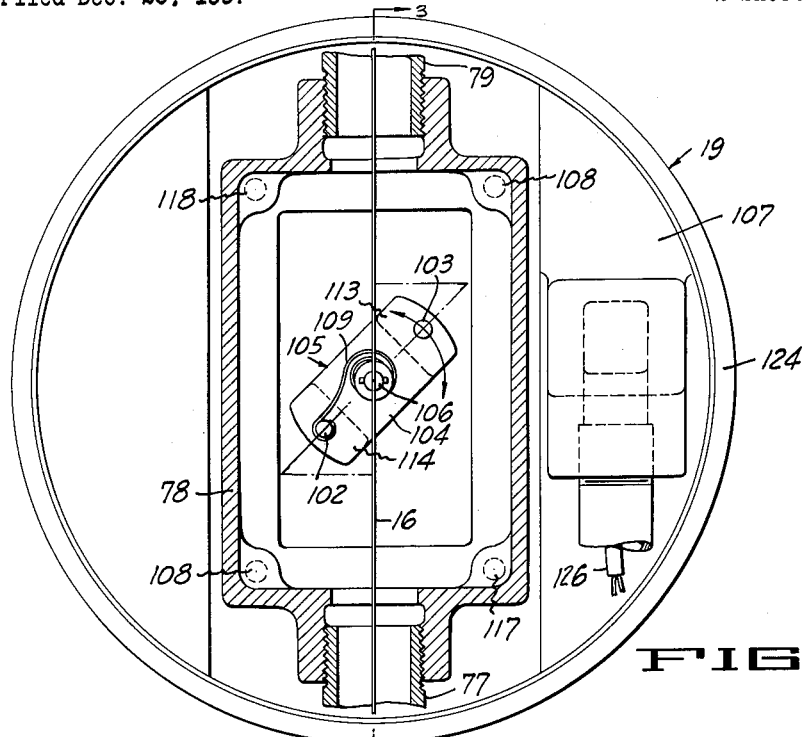
FIG_2_
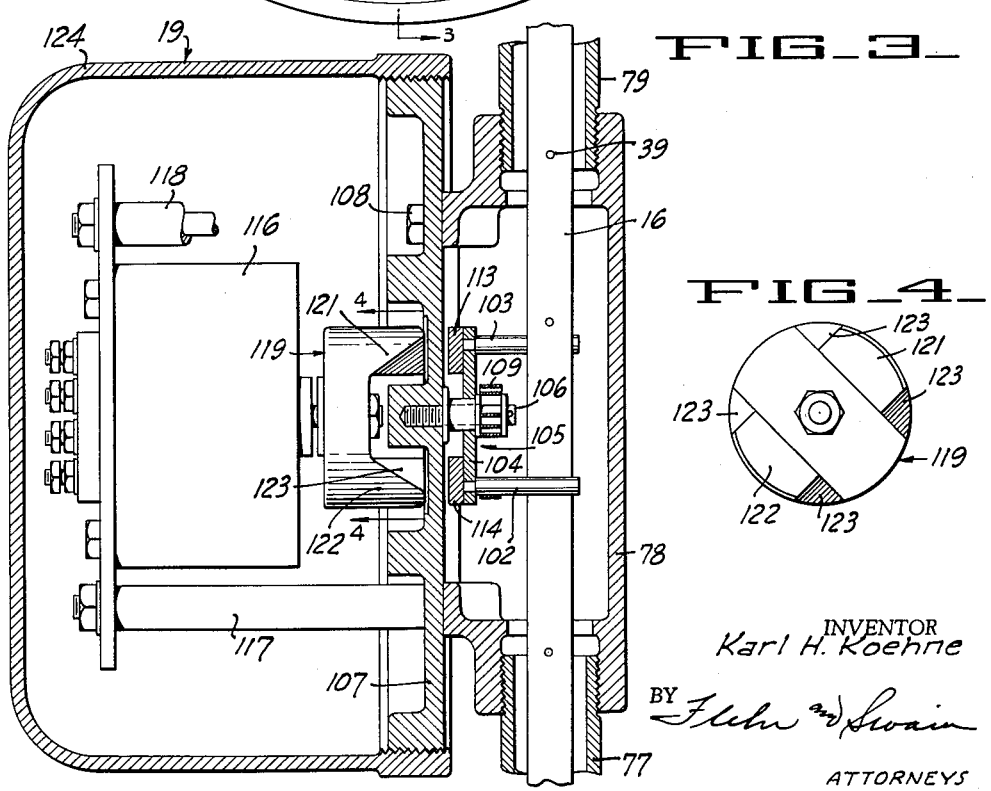
FIG_3_
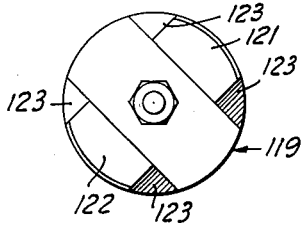
FIG_4_
INVENTOR
Karl H. Koehne
BY
ATTORNEYS United States Patent Office 3,057,199
Patented Oct. 9, 1962

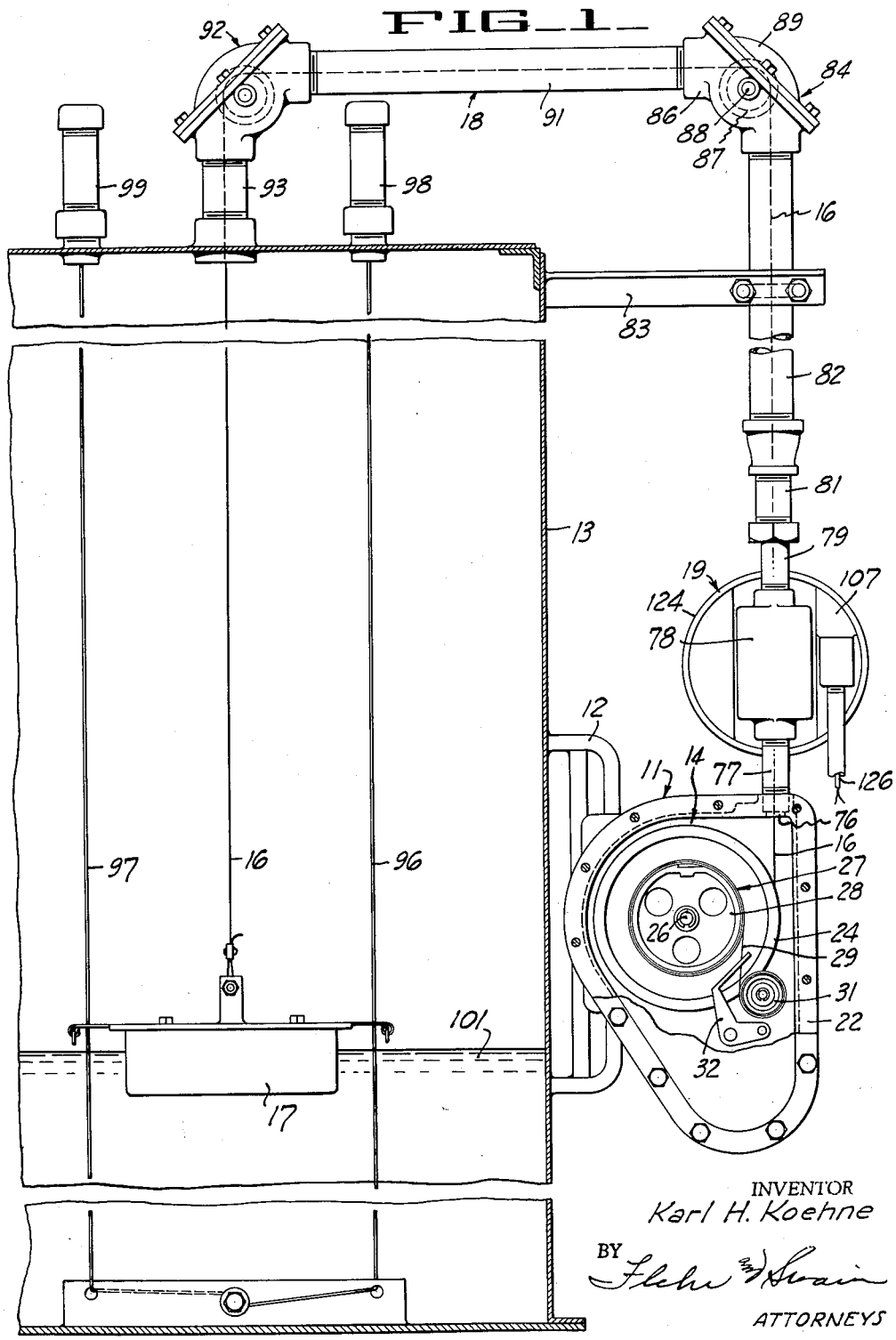

3,057,199
GAUGING APPARATUS
Karl H. Koehne, San Francisco, Calif., assignor to Shand and Jurs Co., Berkeley, Calif., a corporation of California
Filed Dec. 26, 1957, Ser. No. 705,203
14 Claims. (Cl. 73—321)

This invention relates generally to a gauging apparatus and more particularly to a liquid level gauging apparatus where accurate readings are required.

In conventional types of liquid level gauging apparatus, the accuracy of the gauging is adversely affected by friction in the rotating parts of the gauge head and the guide pulleys for the tape. This is particularly true when the equilibrium condition is reached in the gauge because the forces of the float which are used for moving the tape are very small and any friction adversely affects the accuracy of the gauge. When a gauging apparatus has been in service for a considerable period of time, corrosion and gumming of the moving parts will occur which increases the friction and further affects the accuracy of the gauge. In the past, to overcome the adverse effects of this friction, operation checkers have been utilized on gauges by which the reel upon which the tape is wound could be manually rotated to cause a slight movement of the tape. The movement of the tape caused the float to be lifted up for a slight distance above the level of the liquid and then dropped back to the liquid level. The operator by manually checking the operation of the gauge could then ascertain the condition of the moving parts of the gauging installation by actually feeling any resistance to the checking operation. However, operation checkers of this type have not been entirely satisfactory because they cannot overcome the friction in the various guide pulleys for the tape and in the rotating parts in the gauge head. There is, therefore, a requirement for a gauging apparatus which is more accurate and which is not affected by the friction induced by the pulleys and the moving parts in the gauge head.

In general, it is an object of the present invention to provide an improved gauging apparatus which is more accurate than those used in the past.

Another object of the invention is to provide a gauging apparatus of the above character in which the effect of friction on the tape induced by the guide means and the rotating parts of the gauge head is overcome.

Another object of the invention is to provide a gauging apparatus of the above character in which the friction is overcome by inducing recurrent movements in the tape.

Another object of the invention is to provide a gauging apparatus of the above character in which the recurrent movements are introduced before or during a reading operation but which does not affect the tape during a reading operation.

Another object of the invention is to provide a gauging apparatus of the above character in which the recurrent movements are introduced into the tape by inducing lateral and longitudinal movements in the tape.

Another object of the invention is to provide a gauging apparatus of the above character in which the tape will find its proper position even though the frictional forces in the apparatus are large.

Additional objects and features of the invention will appear from the following description in which the preferred embodiment has been set forth in detail in conjunction with the accompanying drawing.

Referring to the drawing:

FIGURE 1 is a side elevational view, partly in cross-section, showing gauging apparatus incorporating the present invention with a portion of the housing for the head assembly broken away to show the reeling and counterbalancing means.

FIGURE 2 is an enlarged side elevational view, partly in cross-section, showing the means used for introducing recurrent movements in the tape.

FIGURE 3 is a cross-sectional view taken along the line 3—3 of FIGURE 2.

FIGURE 4 is a cross-sectional view taken along the line 4—4 of FIGURE 3.

The gauging apparatus illustrated in the drawing consists of a head assembly 11 which is mounted upon a bracket 12 fixed to the side wall of a tank 13. The head assembly includes reeling means 14 which engages a metal gauging tape 16 or like elongate flexible gauging element. The tape is secured to a weight which in this instance has been shown to be a float 17 disposed within the tank 13. Guide means 18 guides the tape between the float and the reeling means 14. Motion inducing means 19 is also provided between the float and the reeling means for inducing recurrent movements in the tape to nullify the effect of friction upon movement of the tape introduced by the guide means and the rotating parts of the head assembly 11.

The head assembly 11 is comprised of a housing 22. The reeling means 14 for the tape 16 is mounted within the housing 22 and includes a reel or tape drum 24 of suitable material such as metal or a thermosetting plastic. The reel is rotatably carried by a shaft 26 mounted in the housing 22.

Counterbalancing means is provided within the head assembly 11 and can be any conventional form such as the negative spring assembly 27 shown in the drawing. Such a negative spring assembly consists of a power hub 28 which is secured to the tape reel 24 for rotation with the tape reel. One end of the negative spring 29 such as that of the type manuafctured by the Hunter Spring Co. of Lansdale, Pa., has one end secured to the power hub 28 and the other end is secured to a rotatably mounted storage drum 31. As is well known to those skilled in the art, the negative spring is a prestressed coil component which has a tendency to wind itself onto the storage drum 31 and as a result provides a variable torque on the power or motor hub 28 to serve as counterbalancing means as hereinafter described. A negative spring guide member 32 is fixed to the housing 22.

As hereinafter described, the gauging tape 16 has one end connected to the reel 24. The tape then passes upwardly through the housing through an opening 76 and into the guide means 18. The guide means consists of a pipe section 77 which is connected to a condulet 78 which forms a part of the movement inducing means 19 as hereinafter described. The tape passes through the condulet 78 and upwardly through other pipe sections 79, 81 and 82 which form a part of the guide means. The vertical run of this portion of the guide means is supported by an angle bracket 83 secured to the side walls of the tank 13. The tape then passes over a direction changing portion of the guide means which consists of a sheave assembly 84. This sheave assembly consists of a housing 86 in which is rotatably mounted a sheave 87 upon a shaft 88. The sheave assembly also includes a cap 89 which is detachably mounted on the housing 86.

After passing over the sheave assembly 84, the tape passes through a horizontal run of piping 91 and into another sheave assembly 92 which again changes the direction of the tape from horizontal to vertical. The sheave assembly 92 is similar to sheave assembly 84 and will not be described in detail. The tape then passes downwardly through piping 93 into the tank 13 where it is connected to the float 17.

The float 17 is guided in its vertical movement by wires 96 and 97 which are fastened to the bottom of the tank 13 as shown. The wires are maintained under tension by suitable means such as the tensioning assemblies 98 and 99 which are of a type well known to those skilled in the art.

The operation of the apparatus hereinbefore described is well known to those skilled in the art and is such that as the level of the liquid 101 in the tank 13 changes, the float will be raised or lowered to cause movement of the tape 16. However, it is readily apparent that any friction in the apparatus itself will tend to impair the accuracy of the readout because the force created by the float must overcome this friction before it will cause movement of the tape. Therefore, any friction introduced by the sheaves 87 in the sheave assemblies 84 and 92 would tend to retard movement of the tape in response to change in level of the liquid in the tank. This is also true of any friction introduced by the rotating elements in the head assembly 11 itself as, for example, friction introduced by the tape reel 24 and the storage drum 31. Upon continued use of the apparatus, the friction introduced by these various components in the gauging assembly will increase because of corrosion, gumming and the like.

To overcome and nullify the effects of such friction upon movement of the tape 16, I have found it desirable to utilize the motion or movement inducing means 19 which will now be described in detail.

The motion or movement inducing means 19 which is shown particularly in FIGURES 2 and 3 of the drawing actually engages the tape to induce lateral and longitudinal movement in the tape as hereinafter described. The particular means shown in the drawing for accomplishing these movements consists of a pair of spaced fork-like elements or pins 102 and 103 which are normally located on opposite sides of the tape 16 as shown in FIGURES 2 and 3 of the drawing. The fork-like elements or pins are mounted on opposite ends of a flat plate-like member 104 which is rotatably mounted on a stud shaft 106 that is threaded into a base plate 107. The base plate is fixed to the condulet 78 by suitable means such as bolts 108. A leaf spring 109 has one end fixed to the shaft 106 and the other end is fixed to the yoke-like member 105 consisting of the pins 102 and 103 and the member 104 by suitable means such as by fastening it to pin 102.

As shown in the drawing, the leaf spring 109 serves to normally maintain the yoke-like member 105 in such position that the pins 102 and 103 are out of engagement with the tape 16 for a purpose hereinafter described.

Permanent magnets 113 and 114 are mounted on opposite ends of the member 104 and are polarized in depth rather than in length. A motor 116 is carried by mounting posts 117 and 118 secured to the base plate 107. A permanent magnet 119 is mounted on the output shaft of the motor 116 and is adapted to be rotated thereby. The permanent magnet may be constructed of any suitable material such as "Alnico" and may be formed in any suitable manner. For example, the magnet may be horseshoe or U-shaped as shown in the drawing and may be provided with pole faces 121 and 122 which have tapered side edges 123. The motor 116 and the magnet 119 are enclosed by a cover 124 which is threaded onto the base plate 107. The motor 116 is connected to a suitable source of power through the leads 126.

It should be pointed out that the base plate 107 should be constructed of material through which magnetic lines of force will penetrate as, for example, aluminum.

Operation of my gauging apparatus in conjunction with the motion inducing means 19 can now be described briefly as follows: Let it be assumed that it is desired to take a reading of the liquid level in the tank 13. Before taking a reading the motor 116 is energized to cause rotation of the permanent magnet 119. It is readily apparent that as the magnet 119 rotates, the magnetic lines of force from the magnet will penetrate the base plate 107 and create a magnetic field which will attract or oppose the fields created by the magnets 113 and 114 carried by the yoke-like member 105. In either event, because of the magnetic fields, the member 105 will be caused to move or rotate in the same direction as the horseshoe magnet 119. However, rotation is limited because the pins 102 and 103 soon engage the tape 16 and cause a twisting of the tape. When the force exerted by the tape together with the force of the spring 109 become greater than the strength of the magnetic fields, the member 105 will refuse to follow the magnet 119 and will be returned to its substantially normal position so that pins 102 and 103 release the tape and allow it to become untwisted. As soon as the magnet 119 has been rotated sufficiently the member 104 is again urged out of its normal position by the fields of the magnet 119 coacting with the fields of the magnets 113 and 114 carried by the member 105. After a certain amount of movement, the member 104 will again return to its normal position.

During the recurrent movement of the member 105, the pins 102 and 103 are periodically urged into and out of engagement with the tape 16 to cause the tape to be twisted slightly about a horizontal axis and released to thereby introduce lateral movements in the tape. At the same time the twisting movement of the pins or arms 102 and 103 serve to cause a shortening of the tape and therefore cause recurrent longitudinal movements of the tape.

By introducing recurrent movements in the tape 16, it has been found that these movements or vibrations are transmitted along the length of the tape in both directions from the point of application of the recurrent movements. The recurrent movements in the tape along the length of the tape cause the float 17 to seek its true position in the liquid 101 and proper positioning of the sprocket wheel 27 so that a correct readout is obtained irrespective of any friction introduced by the guide means for the tape and any friction introduced by the rotating elements in the head assembly. It has been found that this is true because the vibrating tape actually jumps over the sheaves 87 so that any friction normally tending to restrict rotation of the sheaves and therefore movement of the tape 16 will have no effect upon the proper positioning of the float 17 in the liquid. The same is true with regard to the rotating parts in the head assembly 11. The results obtained are similar to that in a dial type pressure gauge in which the gauge itself is lightly tapped by the observer to eliminate the effect of friction in the rotating parts of the dial pressure gauge mechanism.

After recurrent movements have been introduced into the tape for a sufficient period of time to allow the tape 16 and the float 17 to seek their proper positions with respect to the level of the liquid 101 in the tank 13, the motor 116 is deenergized to stop the rotation of the magnet 119. As soon as rotation has ceased, the spring 109 serves to return the member 105 to the position shown in FIGURE 2 in which the pins 102 and 103 are out of engagement with the tape 16. The pins 102 and 103 in this position have no effect upon the proper positioning or movement of the tape 16.

The vibrations or movements set up in the tape by the means 19 will damp out rather rapidly. As the amplitude of the vibrations or movements in the tape diminish, the tape and the float will seek their proper positions. After all motion in the tape has ceased, a reading may be made in the window 49.

With repeated operation of the movement inducing means 19 and with the liquid level in the tank 13 remaining the same, it was found that the tape 16 always returned to the same position and that the same reading was indicated by the counter assembly 41 irrespective of the amount of friction introduced in the sheaves 87 in the sheave assemblies 84 and 92. For example, in one of the tests, one of the sheaves was actually frozen to prevent movement and it was found that the tape 16 and the float 17 found the proper level after recurrent movements had been introduced into the tape by movement of the inducing means 19.

It should be pointed out that although the operation has been described with the vibratory motion being introduced into the tape before the reading operation, it is possible to take a reading during the time vibratory motion is being introduced into the tape.

In one type of apparatus tested and found to be particularly satisfactory, the tape was vibrated at 25 cycles per second. However, additional testing established that satisfactory results can be obtained by vibrating the tape at any relatively rapid frequency from 5 cycles to 60 or more cycles per second. The frequency should be higher than the fundamental mode of the tape itself.

Although I have shown one particular means for introducing movement or motion into the tape, it is readily apparent that other types of apparatus can be readily devised for introducing such motion into the tape. For example, instead of rotating the magnet 119 by electrical means, the magnet 119 could be rotated mechanically by a hand crank connected to the horseshoe magnet by a suitable bearing. It is also readily apparent that if it is desired to use a motor 116 with a lower speed, it is merely necessary to increase the number of poles on the magnet 119. Instead of using magnets on the ends of the members 104, it is possible to utilize members made of soft iron. However, if this were the case, the frequency vibrations introduced into the tape would be reduced by one-half.

In addition to accomplishing the introduction of vibrations into the tape mechanically and electrically, it is also apparent that the same may be done pneumatically as, for example, by utilizing two jets of air spaced apart and arranged so that they would engage opposite sides at spaced points on the tape and then intermittently applying the jets of air.

In addition to vibrating the tape by applying forces at two spaced points on the tape and on opposite sides of the tape, it is readily apparent that similar vibratory or recurrent motion can be introduced into the tape by placing a fixed fulcrum near the tape on one side of the tape and recurrently applying forces to the tape on the other side of the tape at a point spaced from the fulcrum to recurrently bend or twist the tape about the fulcrum to thereby cause lateral and longitudinal movements of the tape. The same movements can also be accomplished by utilizing two fixed spaced apart fulcrums adjacent the tape on one side of the tape and then recurrently applying forces to the tape on the other side of the tape in between the fixed fulcrums to bend or twist the tape about the two fulcrums.

In the present embodiment of my invention, the motion inducing means 19 has been mounted above the head assembly 11. However, it is readily apparent that the motion inducing means may be mounted to engage the tape anywhere between the head assembly and the float 17. The movement inducing means 19 is merely mounted in the position shown for purposes of convenience only.

The movement inducing means 19 may be actuated from a remote location so that it may be used in conjunction with gauging apparatus which gives a remote indication as well as with the apparatus shown in the drawing which is normally read locally.

It is also readily apparent that instead of introducing motion or movement directly into the tape, that it is also possible to cause motion or movement to be introduced into the tape by applying recurrent movement or vibratory movement to the elements which contain and guide the tape. For example, it may be desirable to apply the vibration to the piping in the guide means for the tape and to thereby induce sympathetic vibrations or movements into the tape 16.

From the foregoing it is apparent that I have provided a new and improved gauging apparatus in which friction in the apparatus which tends to prevent proper movement of the gauging tape has been overcome or nullified so that accurate readings may be at all times obtained from the apparatus.

I claim:

1. In a gauging apparatus, a movable elongate element, means engaging the element for guiding the same, said means being characterized by introducing friction tendinng to retard movement of said element, and means for inducing recurrent movements in the element to move it rapidly to nullify the effect of such friction upon movement of the element, said last named means including means which recurrently engages the element to introduce lateral and longitudinal movements of the element.

2. Gauging apparatus as in claim 1 together with means for normally maintaining said means which recurrently engages the element out of engagement with the element during a reading operation.

3. In a gauging apparatus, a movable flexible elongate element, a weight attached to said element, reeling means upon which the element is wound, counterbalancing means for the reeling means, means engaging the element between the reeling means and the weight for guiding the same, said reeling means and said counterbalancing means being characterized by introducing friction tending to retard movement of said element, and means for inducing relatively rapid recurrent lateral movements in the element to cause it to move rapidly to nullify the effect of such friction upon movement of the element, said last named means including means which recurrently engages the element.

4. Gauging apparatus as in claim 3 together with means for normally maintaining said means which recurrently engages the element out of engagement with the element during a reading operation.

5. In a liquid level gauging apparatus, a movable flexible elongate element, a float attached to said element and floating in said liquid, reeling means upon which the element is wound, counterbalancing means for the reeling means, means engaging the element between the reeling means and the float for guiding the same, said means engaging the element, the reeling means and the counterbalancing means being characterized by introducing friction tending to retard movement of said element by forces exerted by said float responsive to a change in the liquid level, and means for inducing relatively rapid recurrent movements in the element to cause it to move rapidly to nullify the effect of such friction upon movement of the element, said last named means including means which recurrently engages the element to twist the element to introduce lateral and longitudinal movement in the element.

6. A gauging apparatus as in claim 5 wherein said means recurrently engaging the element is comprised of two spaced apart elements disposed on opposite sides of said elongate element and adapted to engage the elongate element.

7. Gauging apparatus as in claim 6 together with means for normally maintaining said means which recurrently engages the elongate element out of engagement with the element during a reading operation.

8. In a liquid level gauging apparatus, a movable flexible elongate element, a float attached to said element and resting in said liquid, reeling means upon which the element is wound, counterbalancing means for the reeling means, guide means engaging the element between the reeling means and the float for guiding said element, said guide means, reeling means and counterbalancing means being characterized by introducing friction tending to retard movement of said element, and means for inducing recurrent movements in the element to nullify the effect of such friction upon movement of the element, said means consisting of a pair of spaced apart members disposed on opposite sides of the element and adapted to engage said element, at least one of said members being movable to cause a twisting movement of said element with respect to the other of said members.

9. Gauging apparatus as in claim 8 together with means for normally maintaining said members out of engagement with said tape during a reading operation.

10. In a gauging apparatus, a movable flexible elongate element, a weight attached to said element, reeling means upon which the element is wound, counterbalancing means for the reeling means, means engaging the element between the reeling means and the weight for guiding the same, said reeling means, counterbalancing means and said guide means being characterized by introducing friction tending to retard movement of said element, and means for inducing recurrent movement in the element to nullify the effect of such friction upon movement of the element, said last named means comprising a rotatably mounted member, a pair of pins mounted on opposite ends of said member, said pins being disposed on opposite sides of said element and adapted to engage the element, and means for causing oscillatory movement of said member to cause recurrent twisting of said element.

11. Gauging apparatus as in claim 10 wherein said means for causing oscillatory movement of said member is comprised of a horseshoe magnet, and means for rotating said horseshoe magnet, said horseshoe magnet creating a magnetic field serving to cause movement of said member.

12. Gauging apparatus as in claim 11 together with means for yieldably maintaining said pins out of engagement with said element during a gauge reading operation.

13. In a gauging apparatus, a movable elongate element, means engaging the element for guiding the same, said means being characterized by introducing friction tending to retard movement of said element, and means for inducing relatively rapid recurrent movements in the element to cause it to move rapidly to nullify the effect of such friction upon movement of the element, said last named means including a member adapted to recurrently engage the elongate element to induce the movements in the element, said member being out of engagement with said element during a reading operation.

14. In a gauging apparatus, a movable flexible elongate element, a weight attached to said element, reeling means upon which the element is wound, counterbalancing means for the reeling means, means engaging the element between the reeling means and the weight for guiding the same, said reeling means and said counterbalancing means being characterized by introducing friction tending to retard movement of said element, and means adapted to engage the element between the reeling means and the weight for inducing relatively rapid recurrent movements in the element to cause it to move rapidly to nullify the effect of such friction upon the movement of the element, said last named means being out of engagement with the element during a reading operation.

References Cited in the file of this patent

UNITED STATES PATENTS

| | | |
|---|---|---|
| 1,937,447 | Tokheim | Nov. 28, 1933 |
| 2,396,383 | Moore | Mar. 12, 1946 |
| 2,555,593 | Lee | June 5, 1951 |
| 2,758,474 | McKinney | Aug. 14, 1956 |
| 2,854,752 | Heacock | Oct. 7, 1958 |